United States Patent
Zhao et al.

(10) Patent No.: US 8,154,266 B2
(45) Date of Patent: Apr. 10, 2012

(54) BI-DIRECTIONAL DC POWER CIRCUIT

(75) Inventors: YiFei Zhao, Shenzhen (CN); Bo Qu, Shenzhen (CN)

(73) Assignee: BYD Company Limited (CR)

( * ) Notice: Subject to any disclaimer, the term of this patent is extended or adjusted under 35 U.S.C. 154(b) by 589 days.

(21) Appl. No.: 12/343,845

(22) Filed: Dec. 24, 2008

(65) Prior Publication Data

US 2009/0167269 A1    Jul. 2, 2009

(30) Foreign Application Priority Data

Dec. 29, 2007    (CN) .......................... 2007 1 0308366

(51) Int. Cl.
*G05F 1/40* (2006.01)
(52) U.S. Cl. ........................................ 323/285; 323/271
(58) Field of Classification Search .................. 323/222, 323/225, 268, 271, 282, 285
See application file for complete search history.

(56) References Cited

U.S. PATENT DOCUMENTS

| | | | |
|---|---|---|---|
| 6,642,697 B2 * | 11/2003 | Zuniga et al. ................. | 323/223 |
| 6,870,354 B2 * | 3/2005 | Nishimaki .................... | 323/284 |
| 7,253,596 B2 * | 8/2007 | Yamamoto et al. ........... | 323/281 |
| 7,498,791 B2 * | 3/2009 | Chen ............................ | 323/284 |
| 7,733,671 B2 * | 6/2010 | Chen et al. ................. | 363/21.04 |
| 2009/0058383 A1 * | 3/2009 | Ryoo ............................ | 323/282 |
| 2009/0167247 A1 | 7/2009 | Bai et al. | |
| 2009/0167747 A1 | 7/2009 | Gong et al. | |
| 2009/0322298 A1 * | 12/2009 | Nishida ........................ | 323/282 |
| 2011/0018507 A1 * | 1/2011 | McCloy-Stevens et al. .. | 323/271 |
| 2011/0101932 A1 * | 5/2011 | Nakazono .................... | 323/271 |

FOREIGN PATENT DOCUMENTS

| | | |
|---|---|---|
| CN | 1352480 | 6/2002 |
| CN | 1489252 | 4/2004 |
| CN | 2625185 | 7/2004 |
| CN | 1622438 | 6/2005 |
| CN | 1822085 | 8/2006 |
| CN | 1992511 | 7/2007 |
| CN | 101048932 | 10/2007 |
| CN | 101071552 | 11/2007 |
| CN | 101089937 | 12/2007 |
| CN | 101471048 | 7/2009 |
| CN | 101471577 | 7/2009 |
| JP | 11041914 | 2/1999 |
| WO | 0122107 | 3/2001 |
| WO | 2006068430 | 6/2006 |

OTHER PUBLICATIONS

USPTO Transaction History of related U.S. Appl. No. 12/325,331, filed Dec. 1, 2008, entitled "TFT-LCD Driver Circuit and LCD Devices."
USPTO Transaction History of related U.S. Appl. No. 12/343,031, filed Dec. 22, 2008, entitled "Voltage Balance Circuit for Rechargeable Batteries."

* cited by examiner

*Primary Examiner* — Matthew Nguyen
(74) *Attorney, Agent, or Firm* — Greenberg Traurig LLP (57) ABSTRACT

Bi-directional direct current (DC) power circuit having: a signal processing module for processing feedbacks of output voltage and voltage drop, and outputting pulse control and directional control signals; a pulse width modulation (PWM) module for outputting pulse signals in response to the control signals from the signal processing module; and a switch rectifying module for switching on and off in response to the pulse signals from the PWM module. The pulse control signal from the signal processing module can be in response to an input current signal from a sense resistor. The circuit is capable of achieving both step-up and step-down voltage conversions.

13 Claims, 4 Drawing Sheets

BI-DIRECTIONAL DC POWER CIRCUIT

CROSS-REFERENCE TO RELATED APPLICATION

This application claims priority to Chinese Patent Application No. 200710308366.5, filed Dec. 29, 2007.

FIELD OF THE INVENTION

The embodiments of the present invention relate to power conversion, more specifically, to a step-up and step-down direct current (DC) power conversion circuit.

BACKGROUND

As more and more portable devices use rechargeable batteries as a source of power, there is an increasing need for managing power consumption, discharging and recharging of batteries including the use of alternating current-direct current (AC-DC) adaptors, universal serial bus (USB) chargers, and chargers among various types of batteries. Present day direct current-direct current (DC-DC) power circuits use two different pathways to achieve step-up and step-down voltage conversions with power conversion modules, charge management modules, and various independent, external components.

SUMMARY

Accordingly, a first embodiment discloses a bi-directional direct current (DC) power circuit comprising: a signal processing module configured to process voltage drop feedback and output voltage feedback, and output pulse control and directional control signals; a pulse-width modulation (PWM) module coupled to the signal processing module, the PWM module configured to output pulse signals in response to the pulse control signals; and a switch rectifying module coupled to the PWM module, the switch rectifying module configured to turn on and off based on the pulse signals from the PWM module. The switch rectifying module includes two NMOS's and an inductor, wherein the source of the first NMOS couples to the drain of the second NMOS, each gate of the NMOS couples to the outputted pulse signals of the PWM module, and the inductor couples to the junctions of the two NMOS's. In another embodiment, the switch rectifying module includes a PMOS, a NMOS, and an inductor, wherein the drain of the PMOS couples to the drain of the NMOS, each gate of the PMOS and NMOS couples to the outputted pulse signals of the PWM module, and the inductor couples to the drains of the PMOS and NMOS.

During step-up mode, at the beginning of every PWM period, the NMOS is turned on, the PMOS is turned off and the inductor stores power, and when the inductor achieves a first peak current signal, the NMOS is turned off, the PMOS is turned on and the inductor releases power; and wherein during step-down mode, at the beginning of every PWM period, the PMOS is turned on, the NMOS is turned off and the inductor stores power, and when the inductor achieves a second peak current signal, the PMOS is turned off, the NMOS is turned on and the inductor releases power.

The circuit further includes a sense resistor coupled to the signal processing module for sensing current, the resistance of the sense resistor being about 15 to 100 mΩ. The PWM module includes an oscillator coupled to a bi-directional PWM circuit, and wherein clock signals from the oscillator control the period of pulse signals outputted from the PWM module.

The signal processing module includes a current feedback unit, a voltage feedback unit, and a directional control unit, wherein the directional control unit couples to the current feedback unit, the voltage feedback unit and the bi-directional PWM circuit of the PWM module, and the current feedback unit couples to the oscillator of the PWM module.

The current feedback unit includes a current amplifier and first and third comparators, the current amplifier capable of transforming voltage corresponding to the sensed current of the sense resistor and voltage drop between an initial input voltage and the sense resistor, the first comparator operable to output a logic level current comparator signal by comparing signals from the selection circuit and the current from the current feedback unit, and the third comparator operable to output a reverse current comparator signal by comparing the voltage corresponding to the sensed current of the sense resistor and the voltage drop between the initial input voltage and the sense resistor.

The voltage feedback unit includes an error amplifier, a current setup circuit, a selection circuit, and first and second compensation circuits, the current setup circuit, in response to an amplified signal from the error amplifier, generates a peak current signal for compensation by the first or second compensation circuits as determined by the selection circuit. The first and second compensation circuits are capable of slope compensation and the selection circuit being capable of two-way selection.

The directional control unit includes a second comparator operable to output a directional selection signal in response to static potential and peak current signal from the current setup circuit. The directional selection signal, based on the comparison between the static potential and the peak current signal, determines whether the circuit enters step-up or step-down mode. The static potential includes output voltage from the current amplifier when voltage from the sense resistor equals the voltage drop between the initial input voltage and the sense resistor. The comparators include differential and divider comparators.

A second embodiment discloses a bi-directional direct current (DC) power circuit comprising: a signal processing module configured to process voltage drop feedback and output voltage feedback, and output pulse control and directional control signals; a pulse-width modulation (PWM) module coupled to the signal processing module, the PWM module configured to output pulse signals in response to the pulse control signals; and a switch rectifying module coupled to the PWM module, the switch rectifying module configured to turn on and off based on the pulse signals from the PWM module, wherein the switch rectifying module includes a PMOS, a NMOS, and an inductor, wherein the drain of the PMOS couples to the drain of the NMOS, each gate of the PMOS and NMOS couples to the outputted pulse signals of the PWM module, and the inductor couples to the drains of the PMOS and NMOS.

The circuit further includes a sense resistor coupled to the signal processing module for sensing current, the resistance of the sense resistor being about 15 to 100 mΩ. The PWM module includes an oscillator coupled to a bi-directional PWM circuit, and wherein clock signals from the oscillator control the period of pulse signals outputted from the PWM module. The signal processing module includes a current feedback unit, a voltage feedback unit, and a directional control unit, wherein the directional control unit couples to the current feedback unit, the voltage feedback unit and the bi-directional PWM circuit of the PWM module, and the current feedback unit couples to the oscillator of the PWM module. The current feedback unit includes a current amplifier and first and third differential or divider comparators, the current amplifier capable of transforming voltage corresponding to the sensed current of the sense resistor and voltage drop between an initial input voltage and the sense resistor, the first comparator operable to output a logic level current comparator signal by comparing signals from the selection circuit and the current from the current feedback unit, and the third comparator operable to output a reverse current comparator signal by comparing the voltage corresponding to the sensed current of the sense resistor and the voltage drop between the initial input voltage and the sense resistor. The voltage feedback unit includes an error amplifier, a current setup circuit, a selection circuit, and first and second compensation circuits, the current setup circuit, in response to an amplified signal from the error amplifier, generates a peak current signal for compensation by the first or second compensation circuits as determined by the selection circuit, the first and second compensation circuits capable of slope compensation and the selection circuit being capable of two-way selection.

In one embodiment, the directional control unit includes a second differential or divider comparator operable to output a directional selection signal in response to static potential and peak current signal from the current setup circuit. The directional selection signal, based on the comparison between the static potential and the peak current signal, determines whether the circuit enters step-up or step-down mode. The static potential includes output voltage from the current amplifier when voltage from the sense resistor equals the voltage drop between the initial input voltage and the sense resistor.

A third embodiment discloses a bi-directional direct current (DC) power circuit comprising: a sense resistor for sensing current, the resistance of the sense resistor being about 15 to 100 mΩ; a signal processing module coupled to the sense resistor, the signal processing module configured to process voltage drop feedback and output voltage feedback, and output pulse control and directional control signals; a pulse-width modulation (PWM) module coupled to the signal processing module, the PWM module configured to output pulse signals in response to the pulse control signals; and a switch rectifying module coupled to the PWM module, the switch rectifying module configured to turn on and off based on the pulse signals from the PWM module, wherein the switch rectifying module includes a PMOS, a NMOS, and an inductor, wherein the drain of the PMOS couples to the drain of the NMOS, each gate of the PMOS and NMOS couples to the outputted pulse signals of the PWM module, and the inductor couples to the drains of the PMOS and NMOS.

In one embodiment, the PWM module includes an oscillator coupled to a bi-directional PWM circuit, and wherein clock signals from the oscillator control the period of pulse signals outputted from the PWM module. The signal processing module includes a current feedback unit, a voltage feedback unit, and a directional control unit, wherein the directional control unit couples to the current feedback unit, the voltage feedback unit and the bi-directional PWM circuit of the PWM module, and the current feedback unit couples to the oscillator of the PWM module. The current feedback unit includes a current amplifier and first and third differential or divider comparators, the current amplifier capable of transforming voltage corresponding to the sensed current of the sense resistor and voltage drop between an initial input voltage and the sense resistor, the first comparator operable to output a logic level current comparator signal by comparing signals from the selection circuit and the current from the current feedback unit, and the third comparator operable to output a reverse current comparator signal by comparing the voltage corresponding to the sensed current of the sense resistor and the voltage drop between the initial input voltage and the sense resistor. The voltage feedback unit includes an error amplifier, a current setup circuit, a selection circuit, and first and second compensation circuits, the current setup circuit, in response to an amplified signal from the error amplifier, generates a peak current signal for compensation by the first or second compensation circuits as determined by the selection circuit, the first and second compensation circuits capable of slope compensation and the selection circuit being capable of two-way selection.

The directional control unit includes a second differential or divider comparator operable to output a directional selection signal in response to static potential and peak current signal from the current setup circuit. The directional selection signal, based on the comparison between the static potential and the peak current signal, determines whether the circuit enters step-up or step-down mode. The static potential includes output voltage from the current amplifier when voltage from the sense resistor equals the voltage drop between the initial input voltage and the sense resistor.

Other variations, embodiments and features of the present invention will become evident from the following detailed description, drawings and claims.

DETAILED DESCRIPTION

It will be appreciated by those of ordinary skill in the art that the invention can be embodied in other specific forms without departing from the spirit or essential character thereof. The presently disclosed embodiments are therefore considered in all respects to be illustrative and not restrictive.

Figure 1:
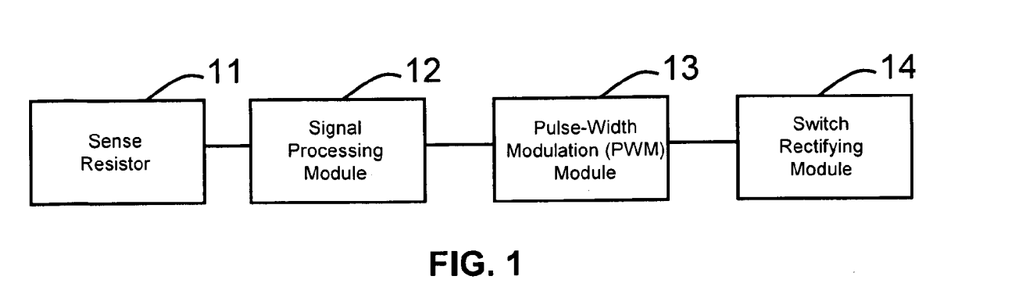
FIG. 1 is a basic principle diagram of a bi-directional direct current (DC) power circuit according to a first embodiment of the present invention.

FIG. 1 illustrates a bi-directional direct current (DC) power circuit according to a first embodiment of the present invention, the circuit includes: a sense resistor 11 for sensing current, whose resistance is set at about 15 to 100 mΩ; a signal processing module 12 configured to process the voltage drop feedback of the current sense resistor 11 and the feedback voltage of output voltage Vout, and output a pulse control signal and a directional control signal; a pulse-width modulation (PWM) module 13, which outputs a pulse signal in response to the pulse control signal from the signal processing module 12; and a switch rectifying module 14, which can be turned on and off in response to the pulse signal from the PWM module 13.

The sense resistor 11 can feedback an inductor current to the signal processing module 12 for processing by the signal processing module 12 and generating a pulse control signal. The PWM module 13, in accordance with the pulse control signal, outputs a pulse signal to the switch rectifying module 14, which can be turned on and off as controlled by the pulse signal from the PWM module 13.

Figure 2:
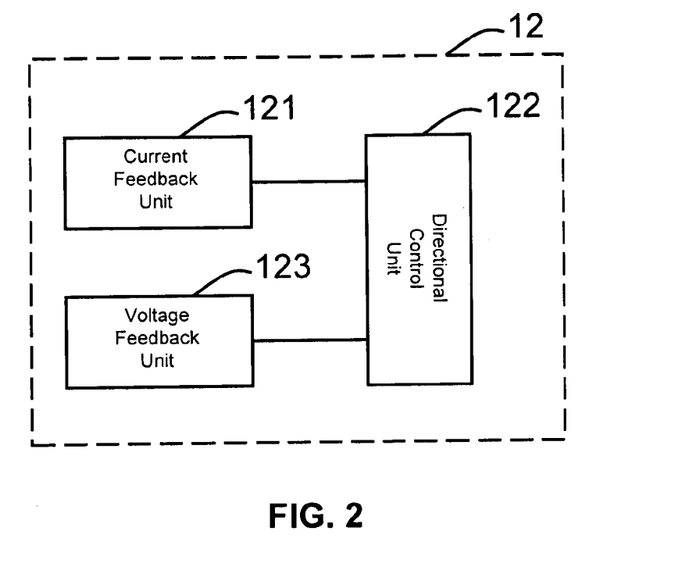
FIG. 2 is a block diagram of the signal processing module.

FIG. 2 illustrates the signal processing module 12 including a current feedback unit 121, a directional control unit 122, and a voltage feedback unit 123. The current feedback unit 121 processes the input feedback current, generates an amplified or transformed current signal, and transmits to the directional control unit 122. The voltage feedback unit 123 processes the input feedback voltage, generates an amplified or transformed voltage signal, and transmits to the directional control unit 122, which subsequently outputs pulse control and directional control signals.

Figure 3:
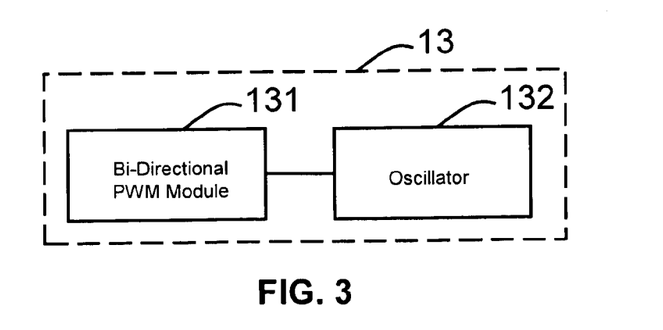
FIG. 3 is a block diagram of the pulse-width modulation (PWM) module.

FIG. 3 illustrates the PWM module 13 including a bi-directional PWM circuit 131 coupled to an oscillator 132, the bi-directional PWM circuit 131 output being synchronous with clock signals generated by the oscillator 132.

Figure 4:
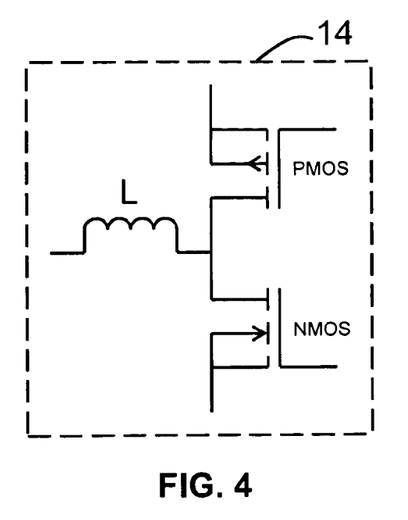
FIG. 4 is a configuration diagram of the switch rectifying module.

FIG. 4 illustrates the switch rectifying module 14 including a P-channel metal oxide semiconductor (PMOS), a N-channel metal oxide semiconductor (NMOS), and an inductor L, the drain of the PMOS being coupled to the source of the NMOS, the gates of the PMOS and NMOS being separately and serially coupled to the pulse signal output of the PWM module 13, while the inductor L couples in series to the drains of the PMOS and NMOS. In another embodiment (not shown), the switch rectifying module 14 includes a high side NMOS, a low side NMOS, and an inductor L, where the source of the high side NMOS couples to the drain of the low side NMOS or vice versa, each gate of the two NMOS's couples to the pulse signal output of the PWM module 13, and the inductor L couples to the junctions of the two NMOS's. In other words, the PMOS and the high side NMOS are interchangeable such that the controls for the switch rectifying module 14 can include a PMOS, a NMOS and an inductor or two NMOS's and an inductor, where the PMOS is substituted with a NMOS. The function of turning on and off the PMOS and NMOS applies in similar fashion for that of two NMOS's. In other words, if the PMOS is turned on, the high side NMOS is turned on (if with two NMOS's) while if the PMOS is turned off, the high side NMOS is turned off (if with two NMOS's).

Figure 5:
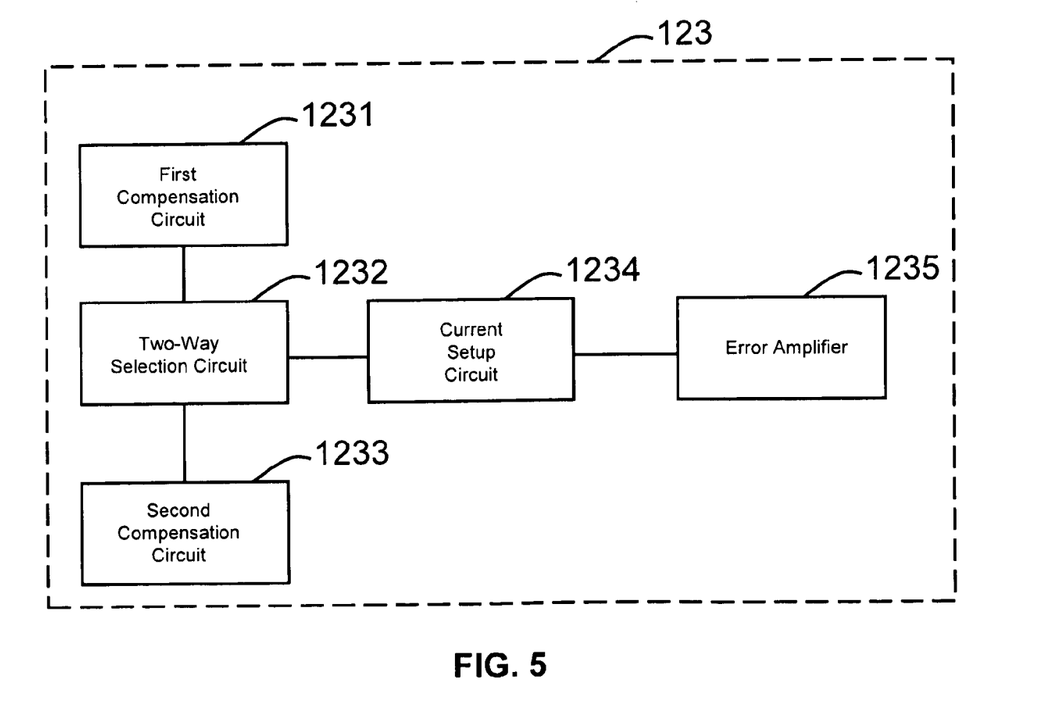
FIG. 5 is a block diagram of the voltage feedback unit.

FIG. 5 illustrates the voltage feedback unit 123 having an error amplifier 1235, a current setup circuit 1234, a selection circuit 1232, a first compensation circuit 1231, and a second compensation circuit 1233. The error amplifier 1235 amplifies the feedback voltage, and transmits the error amplified signal toward the current setup circuit 1234. The current setup circuit 1234, in response to the error amplified signal output from the error amplifier 1235, generates a peak current signal, the signal being compensated by either the first compensation circuit 1231 or the second compensation circuit 1233 as determined by the selection circuit 1232. The selection circuit 1232 is capable of dual or two-way selection while the first compensation circuit 1231 and the second compensation circuit 1233 are capable of providing slope compensation. In other words, the two-way selection includes signal communication or transmission during step-up and step-down modes.

Figure 6:
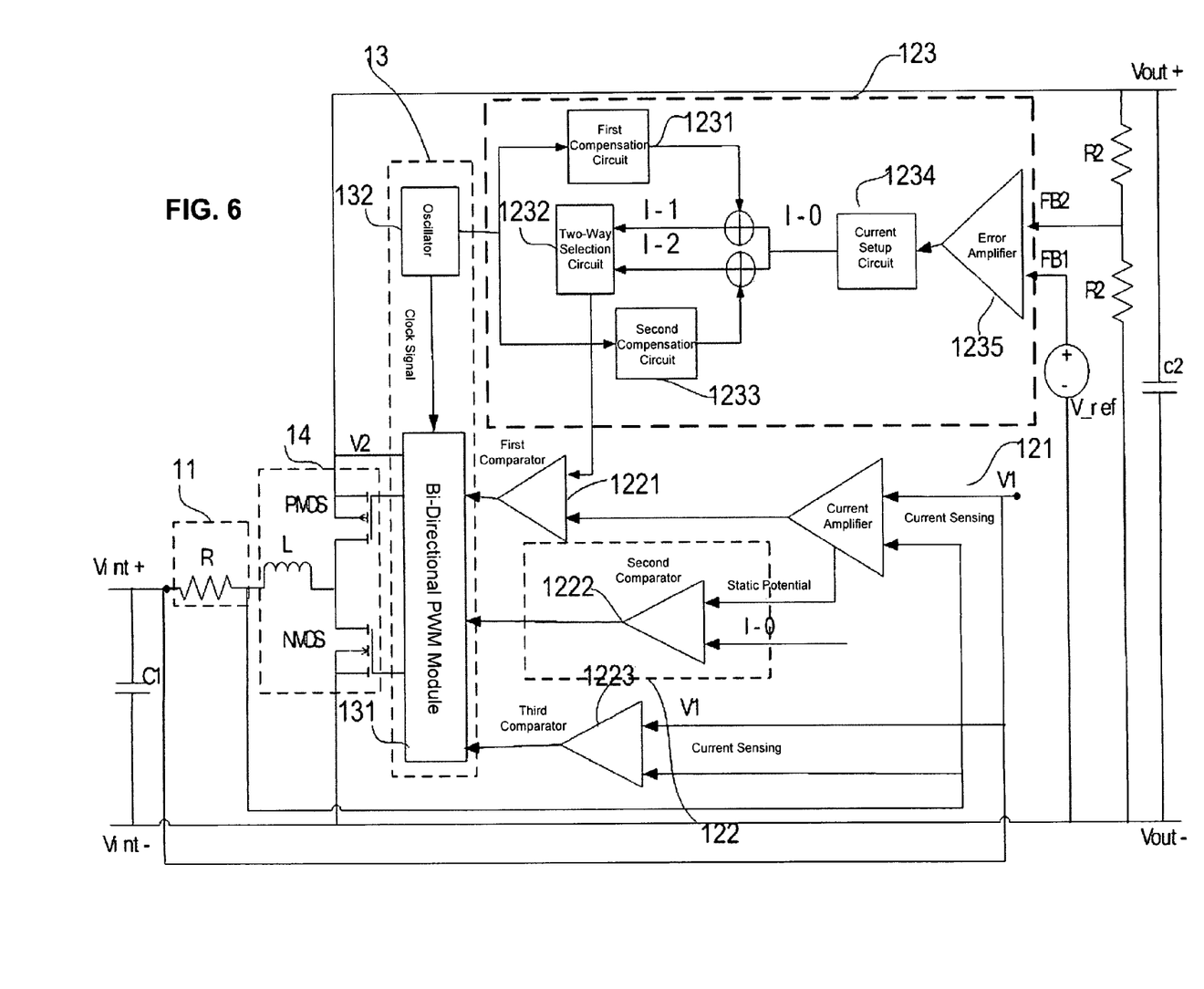
FIG. 6 is a detailed circuit block diagram of the bi-directional DC power circuit.

FIG. 6 illustrates a circuit diagram of the bi-directional DC power circuit according to another embodiment of the present invention. As shown, voltage V1 represents the voltage drop between initial voltage Vint and ground, while voltage V2 represents voltage drop between output voltage Vout and ground. In one example when voltage V1 is compared to voltage V2, voltage V1 is lower than voltage V2. Setting voltage V1 as the lower voltage and voltage V2 as the higher voltage, the sense resistor 11 can be coupled in series between the lower voltage V1 and the inductor L for sensing the voltage drop of the two terminals of the sense resistor 11 so as to sense the passed current through the sense resistor 11 and the inductor L. The lower voltage V1, passing through the sense resistor 11, can be transmitted to the switch rectifying module 14. At the same time, the inductor current sensed from the voltage drop between the two terminals of the sense resistor 11 can be transmitted to the current amplifier within the current feedback unit 121 and a third comparator 1223, while the higher voltage V2 can be transmitted to the bi-directional PWM circuit 131 within the PWM module 13. Two filtering capacitors C1, C2 can be separately coupled with the terminals of the initial voltage Vint and the output voltage Vout, respectively, while two divider resistors R1, R2 can be coupled to the higher voltage V2, which can feedback to the error amplifier 1235 of the voltage feedback unit 123, after passing through the second divider resistor R2.

When power is supplied to the DC power circuit, the sense resistor 11 brings the sensed current into two current pathways, the first current pathway being at the current amplifier of the current feedback unit 121, with the current amplifier transforming or amplifying the voltage drop between the lower voltage V1 and the other terminal of the sense resistor 11, the transformed or current amplified signal from the current amplifier capable of outputting to an anode of a first comparator 1221. When the voltages of the two terminals of the sense resistor 11 are equal, the corresponding potential of the output from the current amplifier is at static potential. The second current can be output to the third comparator 1223, which is capable of comparing the lower voltage V1 and the voltage of the other terminal of the sense resistor 11, and output a directional current comparison signal. The sense resistor 11 further transforms the current on the inductor L within the switch rectifying module 14 into a voltage. In one instance, the comparators 1221-1223 can be divider comparators and differential comparators.

The higher voltage V2, after being divided by the resistor R2, can feedback FB2 to the error amplifier 1235 of the voltage feedback unit 123. The lower voltage V1, through feedback FB1, can be outputted to the error amplifier 1235 of the voltage feedback unit 123. Here, the current within the inductor L can be set to zero and the corresponding potential of the current amplified signal by the current amplifier within the current feedback unit 121 can be set to a reference potential V_ref. Using the error amplifier 1235, the error amplification process can be carried out on the feedback voltage of the lower voltage V1 and the higher voltage V2, to provide an error amplified signal, which can be outputted to the current setup circuit 1234. When the bi-directional DC power circuit is in step-up or step-down mode, the current setup circuit 1234, in response to the error amplified signal, generates a peak current signal I-0, which uses the step-up or step-down mode to determine the direction of current within the inductor L. In combination with the third comparator 1223, the strength of the current on the inductor L can be determined. The second comparator 1222 of the directional control unit 122, in response to the static potential and peak current signal I-0, can output a directional selection signal, such that when the directional selection signal has a high logic potential, the DC power circuit is in step-up mode and if the directional selection signal has a low logic potential, the DC power circuit is in step-down mode.

The peak current signal I-0, after slope compensation by the first compensation circuit 1231, generates a peak current signal I-1 for the step-up mode of the DC power circuit. The peak current signal I-1, after slope compensation by the second compensation circuit 1233, generates a peak current signal I-2 for the step-down mode of the bi-directional DC power circuit. In these instances, the first compensation circuit 1231 and the second compensation circuit 1233 can be controlled by the clock signals of the oscillator 132 of the PWM module 13. The bi-directional selection circuit 1232 can be used for selecting peak current signals I-1 or I-2. When the DC power circuit is in the step-up mode, the bi-directional selection circuit 1232 selects peak current signal I-1. When the DC power circuit is in the step-down mode, the bi-directional selection circuit 1232 selects peak current signal I-2. The selected peak current signals, I-1 or I-2, can be inputted to the cathode of the first comparator 1221 of the directional control unit 122. Using the first comparator 1221, the peak current signals I-1 or I-2 can be compared to the current amplified signal by the current amplifier within the current feedback unit 121 to provide a current comparison signal.

When the bi-directional DC power circuit is in the step-up mode, and when the current amplified signal is lower than the peak current signal I-1, the current comparison signal has a lower logic level. When the current amplified signal is higher than the peak current signal I-0, the current comparison signal has a higher logic level. The second comparator 1222, by comparing the static potential and the peak current signal I-0, outputs a directional selection signal. The bi-directional PWM module 131, in response to a current comparator signal from the first comparator 1221, a directional selection signal from the second comparator 1222, a reverse current comparator signal from the third comparator 1223, and a clock signal from the oscillator 132, can output a corresponding pulse signal. The PMOS and NMOS of the switch rectifying module 14, in response to the pulse signal from the bi-directional PWM module 131, can be turned on and off. Here, the outputted voltage Vout=V_ref×(R1+R2)/R2, after passing through divider resistor, can be adjustably outputted from the DC power supply circuit.

Figure 7:
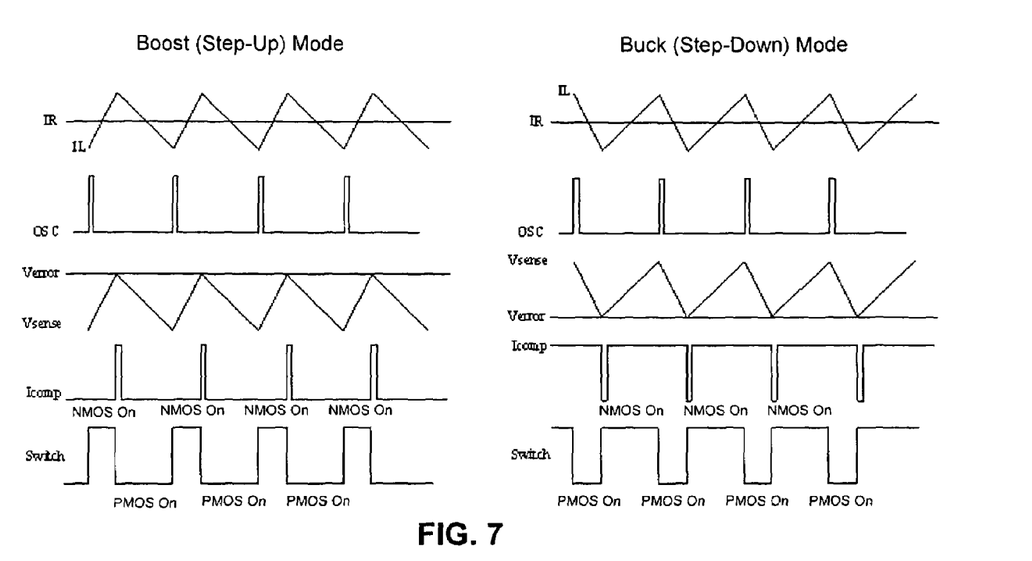
FIG. 7 is a diagram illustrating the timing relationship between the main power path and the inductor current from the sense resistor.

Reference is now made to FIG. 7 illustrating the timing relationship between the switch rectifying module 14 and the detected current from the sense resistor 11. When the circuit is turned on, the former peak current signal is compared with static potential as the inductor current is zero in order to determine whether the circuit is in step-up mode or step-down mode. This marks the beginning of a PWM period. The figure and accompanying description are brief illustrations of these two modes. In step-up mode, at the beginning of the period the PWM module 13 outputs pulse control signals turning on the NMOS and turning off the PMOS. The inductor L charges. Until the detected current signal is higher than peak current signal, high power levels from the current comparator makes the circuit run in reverse and the PWM module 13 outputs the control signals turning off the NMOS, turning on the PMOS, and the inductor L discharges. This marks the end of the PWM period for the step-up mode. In step-down mode, at the beginning of the period the PWM module 13 outputs control signals turning on the PMOS and turning off the NMOS. The inductor L charges. Until the detected current signal is higher than peak current signal, low power levels from the current comparator makes the circuit run in reverse and the PWM module 13 outputs the control signals once again this time turning off the PMOS, turning on the NMOS, and the inductor L discharges. This marks the end of the PWM period for the step-down mode. Whether the bi-directional DC power circuit is in step-up mode or step-down mode, if the inductor L discharges to zero in every cycle, the freewheel MOS turns off by force, as well as the inductor discharging circle. The charging begins when the next timing pulse arrives. This beginning and end of each timing pulse marks a PWM period. Every time a timing pulse arrives, the inductor enters charging state and the cycling process starts again.

Specifically, when the bi-directional power circuit is in step-up mode and power is supplied to the circuit, the sense resistor 11 divides the sensed current into two pathways, a first current pathway to the current amplifier within the current feedback unit 121 for amplifying the corresponding voltage of the sensed current from the sense resistor 11 and the lower voltage V1, the current amplified signal capable of being transmitted to the cathode of the first comparator 1221 within the directional control unit 122. When the lower voltage V1 and the corresponding voltage of the detected current from the sense resistor 11 have the same voltage levels, the voltage potential of the corresponding voltage of the current amplified signal from the current amplifier can be set as static potential. The second current pathway is transmitted to the third comparator 1223 for comparing the lower voltage V1 and the corresponding voltage of the sensed current from the sense resistor 11 and output a reverse current comparator signal. The sense resistor 11 can also transform the current on the inductor L within the switch rectifying module 14 into voltage signals for transmission to the source of the PMOS and the drain of the NMOS.

The higher voltage V2, after having been divided through resistor R2, can feedback FB2 to the error amplifier 1235 within the voltage feedback unit 123, while the lower voltage V1 can feedback FB1 to the error amplifier 1235 of the voltage feedback unit 123. Further, the current on the inductor L can be set to zero and the voltage potential of the current amplified signal from the current amplifier of the current feedback unit 121 can be set as threshold value V_ref. The error amplifier 1235 can process the feedback voltages from the lower voltage V1 and the higher voltage V2 to provide error amplified signals and transmit such signals to the current setup circuit 1234.

The second comparator 1222 of the directional control unit 122, in response to static potential and peak current signal I-0, can process accordingly and output a directional selection signal. When the directional selection signal has a high logic level, the bi-directional DC power circuit enters step-up mode and the peak current signal I-0 passes through the first compensation circuit 1231 for slope compensation forming peak current signal I-1 within the bi-directional DC power circuit, the first compensation circuit 1231 being controlled by the clock signal of the oscillator 132 within the PWM module 13. The two-way selection circuit 1232 proceeds to select the peak voltage I-1 and transmit to the cathode of the first comparator 1221. Using the first comparator 1221, the peak voltage I-1 can be compared with the current amplified signal from the current amplifier of the current feedback unit 121 to provide a current comparator signal. When the current amplified signal is lower than the peak voltage I-1, the current comparator signal will be at low logic level. The second comparator 1222 generates the directional selection signal in response to static potential and peak current signal I-0. The bi-directional PWM module 131, in response to the current comparator signal from the first comparator 1221, the directional selection signal from the second comparator 1222, the reverse current comparator signal from the third comparator 1223, and the clock signal from the oscillator 132, can output a pulse signal for turning on and off the PMOS and NMOS within the switch rectifying module 14.

When the bi-directional power circuit is in step-down mode and power is supplied to the circuit, the sense resistor 11 divides the sensed current into two pathways, a first current pathway to the current amplifier within the current feedback unit 121 for amplifying the corresponding voltage of the sensed current from the sense resistor 11 and the lower voltage V1, the current amplified signal capable of being transmitted to the anode of the first comparator 1221. When the lower voltage V1 and the corresponding voltage of the sensed current from the sense resistor 11 have the same voltage level, the voltage potential of the corresponding voltage of the current amplified signal from the current amplifier can be set as static potential. The second current pathway is transmitted to the third comparator 1223 for comparing the lower voltage V1 and the corresponding voltage of the sensed current from the sense resistor 11 and outputting a reverse current comparator signal. The sense resistor 11 can also transform the current on the inductor L within the switch rectifying module 14, which compares the voltage signal with peak current signal set up signal via a positive current comparator, and outputs Boolean calculations via a logic module as the gate drive signal for turning on and off the NMOS and PMOS.

The higher voltage V2, after having been divided through resistor R2, can feedback FB2 to the error amplifier 1235 within the voltage feedback unit 123, while the lower voltage V1 can feedback FB1 to the error amplifier 1235 of the voltage feedback unit 123. Further, the current on the inductor L can be set to zero and the voltage potential of the current amplified signal from the current amplifier of the current feedback unit 121 can be set as threshold value V_ref. The error amplifier 1235 can process the feedback voltages from the lower voltage V1 and the higher voltage V2 to provide error amplified signals and transmit such signals to the current setup circuit 1234.

The second comparator 1222 of the directional control unit 122, in response to static potential and peak current signal I-0, can process accordingly and output a directional selection signal. When the directional selection signal has a low logic level, the bi-directional DC power circuit enters step-down mode and the peak current signal I-0 passes through the second compensation circuit 1233 for slope compensation forming peak current signal I-2 within the bi-directional DC power circuit, the second compensation circuit 1233 being controlled by the clock signal of the oscillator 132 within the PWM module 13. The two-way selection circuit 1232 proceeds to select the peak voltage I-2 and transmit the peak voltage I-2 to the cathode of the first comparator 1221 within the directional control unit 122. Using the first comparator 1221, the peak voltage I-2 can be compared with the current amplified signal from the current amplifier of the current feedback unit 121 to provide a current comparator signal. When the current amplified signal is higher than the peak voltage I-2, the current comparator signal will be at high logic level. The bi-directional PWM module 131, in response to the current comparator signal from the first comparator 1221, the directional selection signal from the second comparator 1222, the reverse current comparator signal from the third comparator 1223, and the clock signal from the oscillator 132, can output corresponding pulse control signal for turning on and off the PMOS and NMOS within the switch rectifying module 14.

Figure 8:
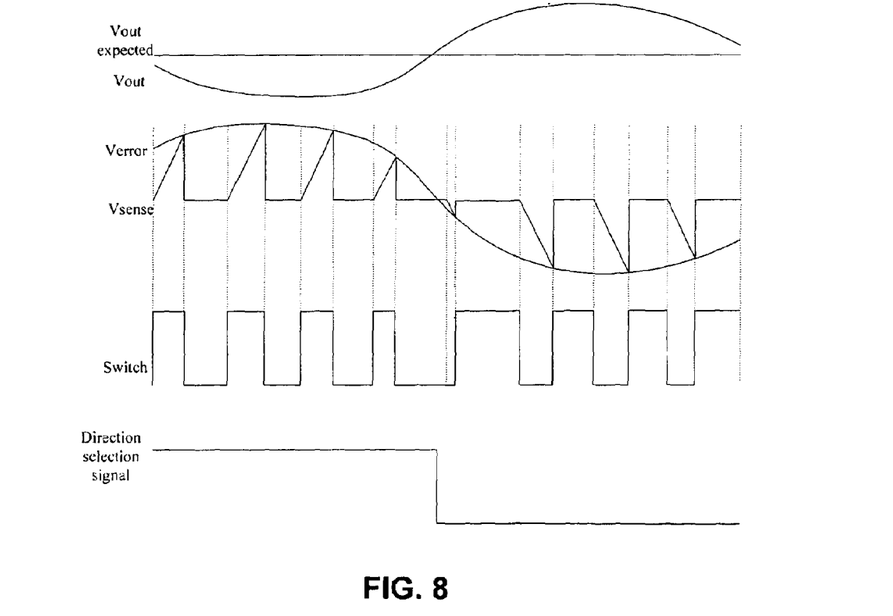
FIG. 8 is an illustration of a bi-directional PWM selection signal.

Reference is now made to FIG. 8 illustrating a bi-directional PWM selection signal. The positive and negative deviations of the output voltage Vout from the expected output voltage Vout can be used to establish a trend. Based on the amount of deviation, directional modulation signal can be established to provide a direction for the direction selection signal.

Based on detection and sensing speed, the current on the inductor L can be transformed into a sensing signal, which can be amplified into a current amplified signal Vsense, the magnitude and direction of the current amplified signal Vsense being proportional to the magnitude and direction of the current on the inductor L within each clock cycle. In one example, the current amplified signal Vsense has a triangular wave signal similar to that shown in the figure. And when the current on the inductor L is zero, the current amplified signal Vsense can be at static potential.

Monitoring the magnitude and direction of deviation of the output voltage Vout, a peak current signal Verror can be established based on timing of the input signal. When the output voltage Vout has zero deviation, the peak current signal Verror has static value similar to the static potential of the current amplified signal Vsense. When the output voltage Vout deviates from zero, the magnitude and direction of the peak current signal Verror can be determined based on corresponding magnitude and direction of deviation of the output voltage Vout. Comparison of the triangular wave signal Vsense to that of the peak current signal Verror produces a switch signal, which can be used together with directional control signal to determine the timing of the turning on and off of the PMOS and NMOS within the switch rectifying module 14, whereby the timing of the turning on and off of the PMOS and NMOS within the switch rectifying module 14 determines the timing and direction of the current on the inductor L.

At the beginning of every period, the current amplified signal Vsense can be initiated and when it achieves peak current signal Verror, the NMOS and PMOS within the switch rectifying module 14 can be turned on and off such that the timing and magnitude of the current on the inductor L would be modulated to be the corresponding value, and by which the output voltage Vout would trend to the expected output voltage Vout. In some instances there may be an offset so that output voltage Vout can be closer to the expected output voltage Vout. Although the positive and negative outputs above refer to directions, as long as the modulation direction is the negative feedback direction, the positive and negative can be reversed.

The embodiments disclose a bi-directional direct current (DC) power circuit having a sense resistor for sensing an input current signal, a signal processing module for feeding back the voltage and current of the sense resistor and direction control processing, and outputting pulse control signals; a pulse width modulation (PWM) module for outputting pulse signals in response to the control signals from the signal processing module; and a switch rectifying module for switching on and off in response to the pulse signals from the PWM module. The signal processing module controls the pulse signals in response to input current signals from the sense resistor. The circuit facilitates the step-up and step-down voltage conversion processes by combining multiple components leading to lowered manufacturing cost and smaller footprint.

Although the invention has been described in detail with reference to several embodiments, additional variations and modifications exist within the scope and spirit of the invention as described and defined in the following claims.

What is claimed is:

1. A bi-directional direct current (DC) power circuit comprising:

a signal processing module configured to process voltage drop feedback and output voltage feedback, and output pulse control and directional control signals;

a sense resistor coupled to the signal processing module for sensing current, the resistance of the sense resistor being about 15 to 100 mΩ;

a pulse-width modulation (PWM) module coupled to the signal processing module, the PWM module configured to output pulse signals in response to the pulse control signals; and a switch rectifying module coupled to the PWM module, the switch rectifying module configured to turn on and off based on the pulse signals from the PWM module, wherein the PWM module includes an oscillator coupled to a bi-directional PWM circuit, and wherein clock signals from the oscillator control the period of pulse signals outputted from the PWM module, wherein the signal processing module includes a current feedback unit, a voltage feedback unit, and a directional control unit, wherein the directional control unit couples to the current feedback unit, the voltage feedback unit and the bi-directional PWM circuit of the PWM module, and the current feedback unit couples to the oscillator of the PWM module; and wherein the current feedback unit includes a current amplifier and first and third comparators, the current amplifier capable of transforming voltage corresponding to the sensed current of the sense resistor and voltage drop between an initial input voltage and the sense resistor, the first comparator operable to output a logic level current comparator signal by comparing signals from the selection circuit and the current from the current feedback unit, and the third comparator operable to output a reverse current comparator signal by comparing the voltage corresponding to the sensed current of the sense resistor and the voltage drop between the initial input voltage and the sense resistor.

2. The circuit of claim 1, wherein the switch rectifying module includes two NMOS's and an inductor, wherein the source of the first NMOS couples to the drain of the second NMOS, each gate of the two NMOS's couples to the outputted pulse signals of the PWM module, and the inductor couples to the junctions of the two NMOS's.

3. The circuit of claim 1, wherein the switch rectifying module includes a PMOS, a NMOS, and an inductor, wherein the drain of the PMOS couples to the drain of the NMOS, each gate of the PMOS and NMOS couples to the outputted pulse signals of the PWM module, and the inductor couples to the drains of the PMOS and NMOS.

4. The circuit of claim 3, wherein:

during step-up mode, at the beginning of every PWM period, the NMOS is turned on, the PMOS is turned off and the inductor stores power, and when the inductor achieves a first peak current signal, the NMOS is turned off, the PMOS is turned on and the inductor releases power; and wherein during step-down mode, at the beginning of every PWM period, the PMOS is turned on, the NMOS is turned off and the inductor stores power, and when the inductor achieves a second peak current signal, the PMOS is turned off, the NMOS is turned on and the inductor releases power.

5. The circuit of claim 1, wherein the voltage feedback unit includes an error amplifier, a current setup circuit, a selection circuit, and first and second compensation circuits, the current setup circuit, in response to an amplified signal from the error amplifier, generates a peak current signal for compensation by the first or second compensation circuits as determined by the selection circuit.

6. The circuit of claim 5, wherein the first and second compensation circuits are capable of slope compensation and the selection circuit being capable of two-way selection.

7. The circuit of claim 1, wherein the directional control unit includes a second comparator operable to output a directional selection signal in response to static potential and peak current signal from the current setup circuit.

8. The circuit of claim 7, wherein the directional selection signal, based on the comparison between the static potential and the peak current signal, determines whether the circuit enters step-up or step-down mode.

9. The circuit of claim 7, wherein the static potential includes output voltage from the current amplifier when voltage from the sense resistor equals the voltage drop between the initial input voltage and the sense resistor.

10. The circuit of claim 7, wherein the comparators include differential and divider comparators.

11. A bi-directional direct current (DC) power circuit comprising:

a signal processing module configured to process voltage drop feedback and output voltage feedback, and output pulse control and directional control signals;

a sense resistor coupled to the signal processing module for sensing current, the resistance of the sense resistor being about 15 to 100 mΩ;

a pulse-width modulation (PWM) module coupled to the signal processing module, the PWM module configured to output pulse signals in response to the pulse control signals; and a switch rectifying module coupled to the PWM module, the switch rectifying module configured to turn on and off based on the pulse signals from the PWM module, wherein the switch rectifying module includes a PMOS, a NMOS, and an inductor, wherein the drain of the PMOS couples to the drain of the NMOS, each gate of the PMOS and NMOS couples to the outputted pulse signals of the PWM module, and the inductor couples to the drains of the PMOS and NMOS, wherein:

the PWM module includes an oscillator coupled to a bi-directional PWM circuit, and wherein clock signals from the oscillator control the period of pulse signals outputted from the PWM module;

the signal processing module includes a current feedback unit, a voltage feedback unit, and a directional control unit, wherein the directional control unit couples to the current feedback unit, the voltage feedback unit and the bi-directional PWM circuit of the PWM module, and the current feedback unit couples to the oscillator of the PWM module;

the current feedback unit includes a current amplifier and first and third differential or divider comparators, the current amplifier capable of transforming voltage corresponding to the sensed current of the sense resistor and voltage drop between an initial input voltage and the sense resistor, the first comparator operable to output a logic level current comparator signal by comparing signals from the selection circuit and the current from the current feedback unit, and the third comparator operable to output a reverse current comparator signal by comparing the voltage corresponding to the sensed current of the sense resistor and the voltage drop between the initial input voltage and the sense resistor; and the voltage feedback unit includes an error amplifier, a current setup circuit, a selection circuit, and first and second compensation circuits, the current setup circuit, in response to an amplified signal from the error amplifier, generates a peak current signal for compensation by the first or second compensation circuits as determined by the selection circuit, the first and second compensation circuits capable of slope compensation and the selection circuit being capable of two-way selection.

12. The circuit of claim 11, wherein:

the directional control unit includes a second differential or divider comparator operable to output a directional selection signal in response to static potential and peak current signal from the current setup circuit;

the directional selection signal, based on the comparison between the static potential and the peak current signal, determines whether the circuit enters step-up or step-down mode; and the static potential includes output voltage from the current amplifier when voltage from the sense resistor equals the voltage drop between the initial input voltage and the sense resistor.

13. The circuit of claim 11, wherein:

the PWM module includes an oscillator coupled to a bi-directional PWM circuit, and wherein clock signals from the oscillator control the period of pulse signals outputted from the PWM module;

the signal processing module includes a current feedback unit, a voltage feedback unit, and a directional control unit, wherein the directional control unit couples to the current feedback unit, the voltage feedback unit and the bi-directional PWM circuit of the PWM module, and the current feedback unit couples to the oscillator of the PWM module;

the current feedback unit includes a current amplifier and first and third differential or divider comparators, the current amplifier capable of transforming voltage corresponding to the sensed current of the sense resistor and voltage drop between an initial input voltage and the sense resistor, the first comparator operable to output a logic level current comparator signal by comparing signals from the selection circuit and the current from the current feedback unit, and the third comparator operable to output a reverse current comparator signal by comparing the voltage corresponding to the sensed current of the sense resistor and the voltage drop between the initial input voltage and the sense resistor;

the voltage feedback unit includes an error amplifier, a current setup circuit, a selection circuit, and first and second compensation circuits, the current setup circuit, in response to an amplified signal from the error amplifier, generates a peak current signal for compensation by the first or second compensation circuits as determined by the selection circuit, the first and second compensation circuits capable of slope compensation and the selection circuit being capable of two-way selection;

the directional control unit includes a second differential or divider comparator operable to output a directional selection signal in response to static potential and peak current signal from the current setup circuit;

the directional selection signal, based on the comparison between the static potential and the peak current signal, determines whether the circuit enters step-up or step-down mode; and the static potential includes output voltage from the current amplifier when voltage from the sense resistor equals the voltage drop between the initial input voltage and the sense resistor.

* * * * *